United States Patent [19]

Tassinario

[11] Patent Number: 4,743,813
[45] Date of Patent: May 10, 1988

[54] DIRECT CURRENT MOTOR WITH ELECTRONIC COMMUTATION CIRCUIT AND ENCODER-CONTROLLED WINDING POWER

[75] Inventor: Giampiero Tassinario, Florence, Italy

[73] Assignee: Mavilor Systemes S.A.

[21] Appl. No.: 919,018

[22] Filed: Oct. 15, 1986

[30] Foreign Application Priority Data

Oct. 15, 1985 [CH] Switzerland ............ 4440/85

[51] Int. Cl.$^4$ ............................ H02K 29/10
[52] U.S. Cl. .................... 318/138; 318/254; 318/439
[58] Field of Search ........... 318/138, 254, 439, 480; 310/68 R

[56] References Cited

U.S. PATENT DOCUMENTS

| 4,211,962 | 7/1980 | Grunleitner et al. | 318/254 A |
| 4,568,862 | 2/1986 | Tassinario | 318/254 |
| 4,629,948 | 12/1986 | Tassinario | 318/254 |

FOREIGN PATENT DOCUMENTS 2095931 10/1982 United Kingdom ........ 318/254

*Primary Examiner*—Bentsu Ro
*Attorney, Agent, or Firm*—Kane, Dalsimer, Kane, Sullivan & Kurucz

[57] ABSTRACT

The commutation of the motor which has no commutator is by electronic commutation, the excitation being carried out by p pairs of permanent magnets (12) carried by the rotor (10). The powering of the winding (6,6') of the stator is controlled by an encoder (19, 20) synchronized with the rotor (10). The electronic commutation circuit includes an odd number of sensors detecting the angular position of the rotor (10). The number of connection terminals of the winding to which the supply voltage is selectively applied is equal to the number of sensors or to a multiple of this number and the number of switchings per complete revolution of the rotor is equal to the number of sensors multiplied by the number of pairs of poles (12). During each switching, the connection between one of the terminals of the voltage source and at least one of the connection terminals is maintained. The mode of commutation is automatically changed according to the requirements of the motor load.

10 Claims, 12 Drawing Sheets

|    | g1 | g2 | g3 | g4 | g5 | g6 | g7 | g8 | g9 |
|----|----|----|----|----|----|----|----|----|----|
| 1  | +  | 0  | 0  | 0  | −  | 0  | 0  | 0  | 0  |
| 2  | +  | 0  | 0  | 0  | 0  | −  | 0  | 0  | 0  |
| 3  | 0  | +  | 0  | 0  | 0  | −  | 0  | 0  | 0  |
| 4  | 0  | +  | 0  | 0  | 0  | 0  | −  | 0  | 0  |
| 5  | 0  | 0  | +  | 0  | 0  | 0  | −  | 0  | 0  |
| 6  | 0  | 0  | +  | 0  | 0  | 0  | 0  | −  | 0  |
| 7  | 0  | 0  | 0  | +  | 0  | 0  | 0  | −  | 0  |
| 8  | 0  | 0  | 0  | +  | 0  | 0  | 0  | 0  | −  |
| 9  | 0  | 0  | 0  | 0  | +  | 0  | 0  | 0  | −  |
| 10 | −  | 0  | 0  | 0  | +  | 0  | 0  | 0  | 0  |
| 11 | −  | 0  | 0  | 0  | 0  | +  | 0  | 0  | 0  |
| 12 | 0  | −  | 0  | 0  | 0  | +  | 0  | 0  | 0  |
| 13 | 0  | −  | 0  | 0  | 0  | 0  | +  | 0  | 0  |
| 14 | 0  | 0  | −  | 0  | 0  | 0  | +  | 0  | 0  |
| 15 | 0  | 0  | −  | 0  | 0  | 0  | 0  | +  | 0  |
| 16 | 0  | 0  | 0  | −  | 0  | 0  | 0  | +  | 0  |
| 17 | 0  | 0  | 0  | −  | 0  | 0  | 0  | 0  | +  |
| 18 | 0  | 0  | 0  | 0  | −  | 0  | 0  | 0  | +  |

|    | g'1 | g'2 | g'3 | g'4 | g'5 | g'6 | g'7 | g'8 | g'9 |
|----|-----|-----|-----|-----|-----|-----|-----|-----|-----|
| 1  | +   | 0   | 0   | 0   | −   | −   | 0   | 0   | 0   |
| 2  | +   | +   | 0   | 0   | 0   | −   | 0   | 0   | 0   |
| 3  | 0   | +   | 0   | 0   | 0   | −   | −   | 0   | 0   |
| 4  | 0   | +   | +   | 0   | 0   | 0   | −   | 0   | 0   |
| 5  | 0   | 0   | +   | 0   | 0   | 0   | −   | −   | 0   |
| 6  | 0   | 0   | +   | +   | 0   | 0   | 0   | −   | 0   |
| 7  | 0   | 0   | 0   | +   | 0   | 0   | 0   | −   | −   |
| 8  | 0   | 0   | 0   | +   | +   | 0   | 0   | 0   | −   |
| 9  | −   | 0   | 0   | 0   | +   | 0   | 0   | 0   | −   |
| 10 | −   | 0   | 0   | 0   | +   | +   | 0   | 0   | 0   |
| 11 | −   | −   | 0   | 0   | 0   | +   | 0   | 0   | 0   |
| 12 | 0   | −   | 0   | 0   | 0   | +   | +   | 0   | 0   |
| 13 | 0   | −   | −   | 0   | 0   | 0   | +   | 0   | 0   |
| 14 | 0   | 0   | −   | 0   | 0   | 0   | +   | +   | 0   |
| 15 | 0   | 0   | −   | −   | 0   | 0   | 0   | +   | 0   |
| 16 | 0   | 0   | 0   | −   | 0   | 0   | 0   | +   | +   |
| 17 | 0   | 0   | 0   | −   | −   | 0   | 0   | 0   | +   |
| 18 | +   | 0   | 0   | 0   | −   | 0   | 0   | 0   | +   |

|   | g"1 | g"4 | g"7 |
|---|-----|-----|-----|
| 1 | +   | −   | −   |
| 2 | +   | +   | −   |
| 3 | −   | +   | −   |
| 4 | −   | +   | +   |
| 5 | −   | −   | +   |
| 6 | +   | −   | +   |

DIRECT CURRENT MOTOR WITH ELECTRONIC COMMUTATION CIRCUIT AND ENCODER-CONTROLLED WINDING POWER

FIELD OF THE INVENTION

Direct current motor without commutator, with electronic commutation, with permanent magnet excitation, provided with a rotor carrying p pairs of permanent magnets and a stator provided with at least one winding, the powering of the coils of the winding being able to be controlled by an encoder synchronized with the rotor by mechanical or other means, through an electronic commutation circuit including a number of sensors arranged along the periphery of the encoder detecting the angular position of the rotor, the number of these sensors is odd and equal to 2N+1, N being a positive integer, the number of connection terminals of the winding to which the supply voltage is selectively applied is equal to 2N +1 or a multiple of this, the number of commutations per complete revolution of the rotor is equal to 2p(2N +1) and during each commutation the connection between one of the terminals of the voltage source and at least one of the connection terminals of the winding is maintained.

PRIOR ART

A motor operating without brushes and without a commutator and whose fixed winding excitation is controlled by a device that is integral with respect to the motor shaft is described in the applicant's European patent application EP-A-No. 0123347. According to an example of embodiment and when the winding is overlapped, the commutation is controlled by eight switches ensuring the excitation of the armature winding according to the position of the rotor. During each commutation four switches are operated, the two which were connecting the winding to the voltage source go to the 0 state and two others which were at the 0 state connect the winding to the + and − terminals respectively of the voltage source.

During each commutation, two switches through which the supply current passes must be operated in order to switch off this current which subsequently will pass through two other switches. One section of the winding which until this point had been passed through by a positive current must be passed through by a negative current and one section of the winding passed through by a negative current will have to be passed through by a positive current. Both the switching of the supply current at two places in the circuit and the necessity of changing the direction of current in two sections of the winding create mechanical (moving parts of the motor) as well as electrical shocks during each commutation.

In DE-A-No. 2 020 793, there is described a device for the switching of the power supply of the stator windings of a direct current motor such that, on each commutation, two consecutive connection terminals of the armature, one of which is already connected to the voltage source, are operated on in such a way as to connect the other terminal to the voltage source and to disconnect that which was already connected.

In DE-A-No. 3 345 272 another commutation process is proposed enabling, over m > 5 stator windings during each commutation, there to be one winding which is not passed through by a current while (m−1)/2 are passed through by a positive current and (m−1)/2 by a negative current, thus always having an impedance balance between the two curc rent paths. The process described in DE-A-No. 3 345 272 enables gentle switching and avoids both mechanical and electrical shocks. However, in high load conditions and particularly at high speed, this method of switching is not favorable because the switching device cannot follow.

An object of the present invention is to enable the creation of a motor of the type mentioned but better suited to the various working conditions by taking advantage of these two switching principles.

SUMMARY OF THE INVENTION

The motor according to the invention is characterized in that the commutation circuit is designed to operate in two commutation modes, the choice of mode being made by a control unit according to the requirements of the load, the two modes are:

either, during each commutation operation, two switches connected to two sensors acting on two consecutive connection terminals are simultaneously operated, one disconnecting the connection terminal connected to the other terminal of the voltage source while the second switch connects the consecutive connection terminal to the said other terminal of the voltage source, or, in each commutation state, three switches connect three of the connection terminals to the voltage source, two consecutive connection terminals being connected to the same terminal of the voltage source and, during each commutation, in that two switches acting on two non-consecutive terminals are operated such that each of the terminals of the voltage source is alternately connected to two consecutive connection terminals.

The fact of having an odd number of sensors and connection terminals enables operation during each commutation such that at least one of the commutation terminals connected to the terminals of the voltage source is not disconnected from the voltage source.

Depending on the load state of the motor it is possible to go from one type of commutation to the other. This transition is preferably carried out automatically.

The first mode of commutation, described in claim 1, has the feature that during a commutation there is, on the one hand, only one single switch which interrupts the current in the circuit and, on the other hand, there is only one single section of the winding which is subjected to a change in direction of the current passing through it;

The second mode of commutation, described in claim 1, has the feature that the switching is even gentler as there is no unbalance between the impedances of the two branches of the winding in parallel, and it is not necessary for the current to change direction in one section of the winding, but the current in this section is initially cancelled by connecting the two consecutive connection terminals to the same terminal of the voltage source and, during the next switching a current is made to pass in the opposite direction from that of the current which was flowing in this branch before being cancelled.

In principle the second mode enables very gentle switching at low speed and high load or at high speed and low load and is preferred to the first commutation mode. It is also possible to achieve gentle starting of a motor by using the second type of switching which enables balanced impedances of the two current paths to be obtained.

In general, the choice of commutation mode can also be manually controlled by an external switch and it is also possible to choose one or the other mode independently of the motor load which could be more suitable to a specific utilization.

Therefore, for a same motor winding, it is possible either automatically, or at will, to change from one commutation mode to the other depending on the speed and/or the current or other criteria.

In certain cases the winding must be delta or star connected, i.e. only three connection terminals are effectively connected to the winding. In order to rationalize the construction starting from a winding having M connection terminals, M being an odd number and divisible by 3, the three terminals connected to the winding are chosen while retaining the connection of one terminal every M/3 terminals, the other terminals being disconnected. In this case there are three sensors and 2p.3 commutations per complete revolution of the rotor. The invention will be described in more detail with the help of the appended drawing with reference to a direct current motor similar to that described in EP-A-No. 0123347.

DESCRIPTION OF THE PREFERRED EMBODIMENTS

Figure 1:
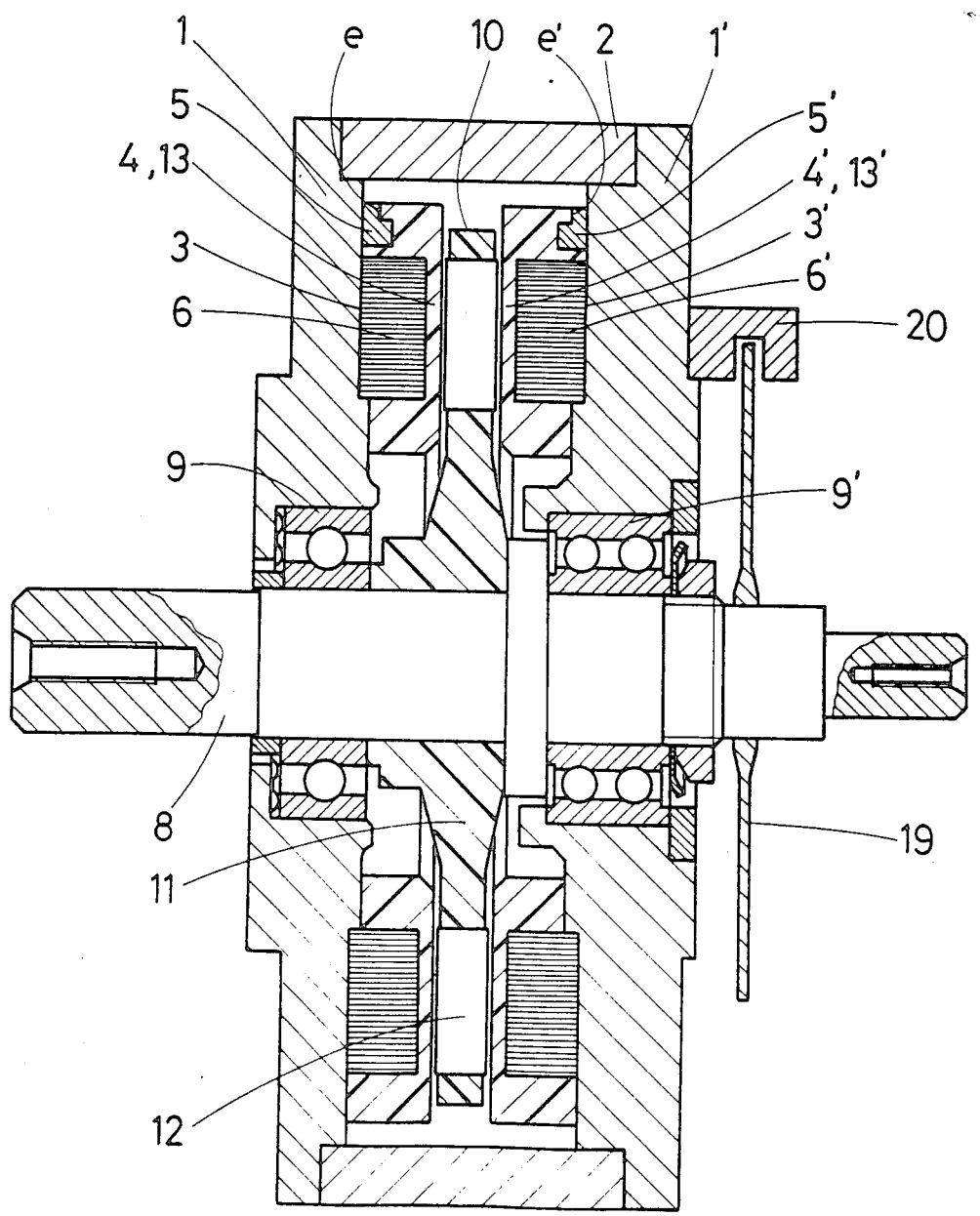
FIG. 1 is an axial cross-section of a motor according to a first embodiment.

The motor shown in FIG. 1 has two stator halves symmetrically placed on either side of the disk shaped rotor 10, these half-stators each being formed from an aluminum plate, 1 and 1' respectively, and the armature, 3 and 3' respectively, fixed to the inside face of the corresponding plate, 1 and 1' respectively. The two plates 1 and 1' are connected by a ring 2 in order to form a casing.

Figure 3:
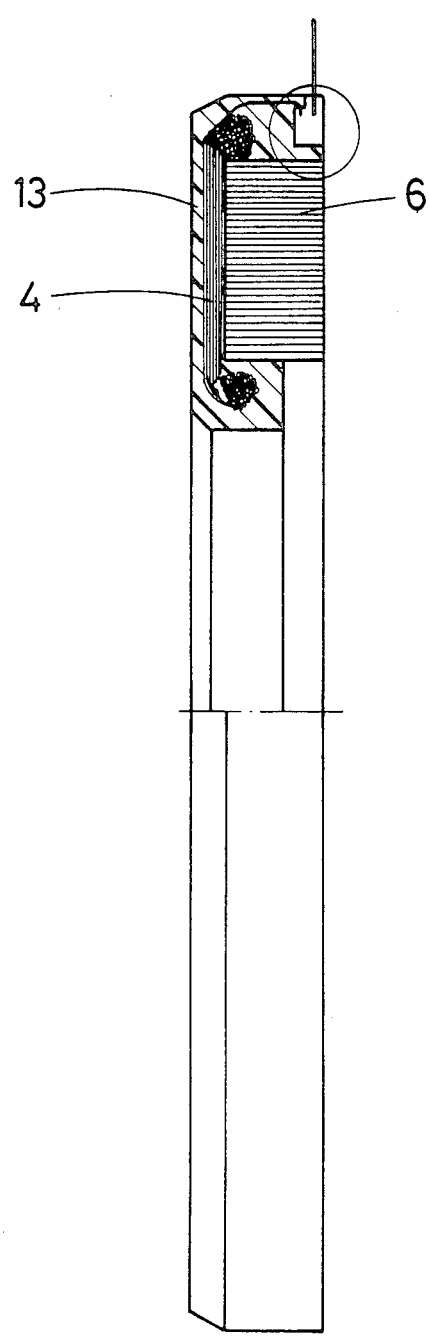
FIG. 3 an axial cross-section of one of the armatures of the motor according to FIG. 1 at a larger scale.

According to FIGS. 1 and 3 the armature 3 is formed from a winding 4 in the form of a flat basket and an annular armature iron 6, both embedded in a plastic material 13, as well as, coaxially incorporated in the space outside these two components, of a ring segment 5 partially embedded in the same plastic material 13. The armature 3 thus formed constitutes a compact part, the manufacture of which will be described in greater detail. The armature iron 6 is formed by rolling a ribbon shaped magnetic sheet to form a packet of annular sheets and the armature winding 4 is placed on its side facing the rotor 10. The other armature 3' has the same construction formed of components 4', 5' and 6' and the plastic material 13'.

The ring segment, 5 and 5' respectively, which will also be described in more detail hereafter, is divided into a number of plates which are insulated from each other forming the terminals to which are connected the coils forming the armature winding, 4 and 4' respectively. Electrical conductors e, e' (FIG. 1) connect the plates of the segment of the connections ring, 5 and 5' respectively, towards the exterior to the electronic commutation circuits. The said circuits are controlled by a rotary encoder which is known per se comprising an encoder disk 19 fixed to the motor shaft 8 and a photoelectric system 20 with light emitters such as photodiodes and receivers, the disk having notches, runs in the space between the emitters and the receivers.

The light emitters and the associated receivers, or magnetic sensors must be arranged in such a way that they are successively activated during the passage of each pair of permanent magnet poles. Theoretically the sensors must be placed on a geometric arc of 360°/2p, i.e. in the space occupied by a magnetic pole. However, in certain cases, as this space is very small, they can be arranged in another way and such that the sensors are successively activated during the successive passage of each pair of poles as described in European patent application No. 0 015 9069.

Figure 3A:
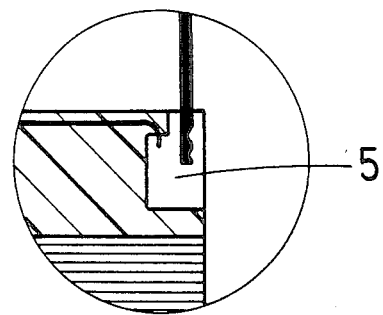
FIG. 3A is an enlarged detail of FIG. 3.
Figure 3B:
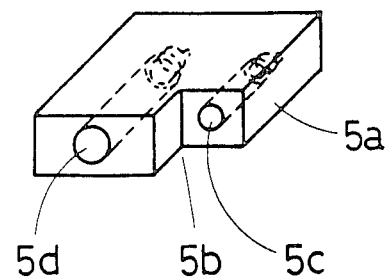
FIG. 3B is a perspective view of one of the connection terminals.

The ring segment is composed of rectangular plates 5a (FIGS. 3A, 3B) having a notch 5b and provided with two passages 5c and 5d parallel to the height of the plate. The passage 5c which opens into the notch 5b is intended to receive a wire connected to the armature winding which will be described hereafter, and the passage 5d for the wire e or e' going to the commutation circuit.

The construction and connection of the coils forming the armature winding, 4 and 4' respectively, will be described hereafter in detail with reference to FIGS. 6 and 7.

The rotor 10 in the form of a flat disk is, for example, pressed on the shaft 8 of the motor. It is formed from a body 11 made from synthetic resin which has a central excess thickness forming a hub. In the considered example, the body 11 encloses eight permanent magnets 12 in the shape of a segment of ring, which are for example incorporated in a carbon fiber support with provided housings, the whole being embedded in the synthetic resin which makes the rotor integral with the hub fixed on the shaft 8 of the motor. These permanent magnets 12, preferably formed from Samarium-Cobalt have their magnetic axis parallel with the shaft 8 of the motor and consequently form magnetic fields parallel to the shaft. The thickness of the permanent magnets 12, whose polar faces are free on each side, is slightly larger than the thickness of the area of the synthetic material body 11 which surrounds them. The permanent magnets 12 are regularly spaced around the periphery of the rotor 10 and arranged such that on each of the faces of the rotor the polar faces succeed each other around the circumference, presenting alternating polarity, and there are therefore four pairs of regularly spaced poles on each face of the rotor.

In the general case there can be p pairs of poles. The permanent magnets 12 move in the air-gap between the sides of sheets 6 and 6' of the two stator halves facing the rotor, the width of this air-gap being determined by the thickness of the flat armature windings, 4 and 4' respectively, embedded in the synthetic resin 13 and 13' and by the necessary clearance between the stator and the rotor. The magnetic fluxes of the permanent magnets which succeed each other around the circumference, are closed through sheets 6 and 6' in such a way that the plates 1 and 1' have no magnetic function and can therefore be advantageously made from aluminum which is favorable as regards weight. Sheets 6 and 6' are formed from a rolled iron ribbon, this ribbon being provided with an insulating layer in order to suppress the eddy currents. This iron has a high magnetic permeability. Sheets 6 and 6' can of course be produced in another known way for example by pressing a powder of iron mixed with a binder, the iron particles being oriented in such a way that the electrical conductivity in the radial direction is extremely low or practically nonexistent in order to prevent the appearance of eddy currents.

Figure 5:
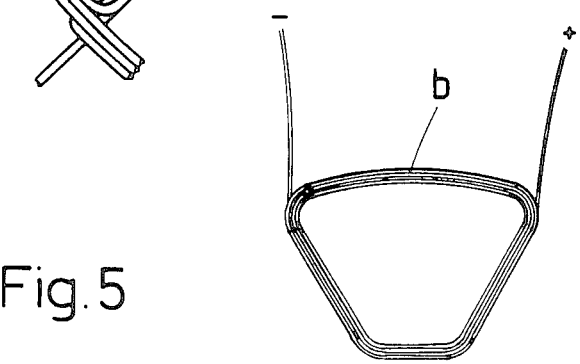
FIG. 5 a diagrammatic view of one of the coils of the winding.

Each of the armature windings 4 and 4' is produced in the form of a wave winding as used in conventional direct current motors; it is formed of coils or partial windings which mutually partially overlap in a known way in order to form a rosette shaped winding (FIG. 5). There are $p \cdot n + 1$ coils, p being the number of pairs of poles on one side of the rotor and n the number of commutation terminals of the armature winding. In the considered example $p=4$ and $n=9$ so that each armature winding is formed of 37 coils designated by b1 to b37 in FIGS. 6 and 7. In these figures the coils are diagrammatically represented by a single turn as is customary; in practice each coil of course has several turns, one of these coils b being shown in FIG. 5. The two faces of each coil which radially cross the permanent magnetic field are at a distance of one polar division from each other, i.e. equal to the distance between the centers of two neighboring permanent magnetic poles along the circumference corresponding with a shift of 45° in the considered example, as represented in FIG. 7 in which the eight poles of the permanent magnets 12 of one of the sides of the rotor are diagrammatically indicated. When a coil is passed through by a current in this way, the directions of the current in the zones of the two neighboring poles are opposite.

The considered example, in which the rotor includes eight permanent magnets and the armature winding includes only 37 coils, has been chosen in order not to complicate the representation of the winding and to make it more legible. In practice, it is naturally possible to choose a higher number of coils and a higher number of connection terminals.

Figure 6:
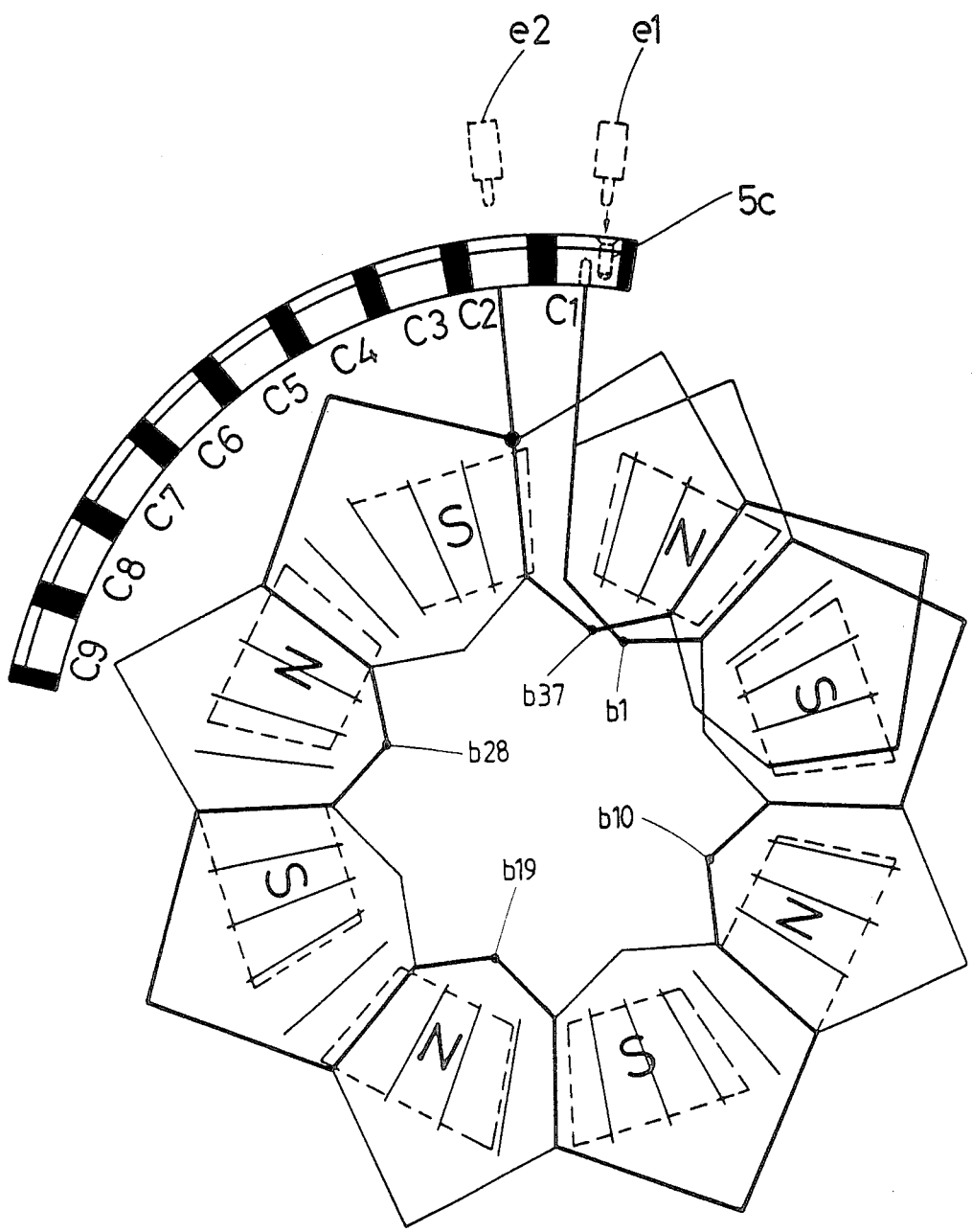
FIG. 6 an axial view of the connection terminals with a diagrammatic representation of four pairs of poles and another section of the winding.
Figure 7:
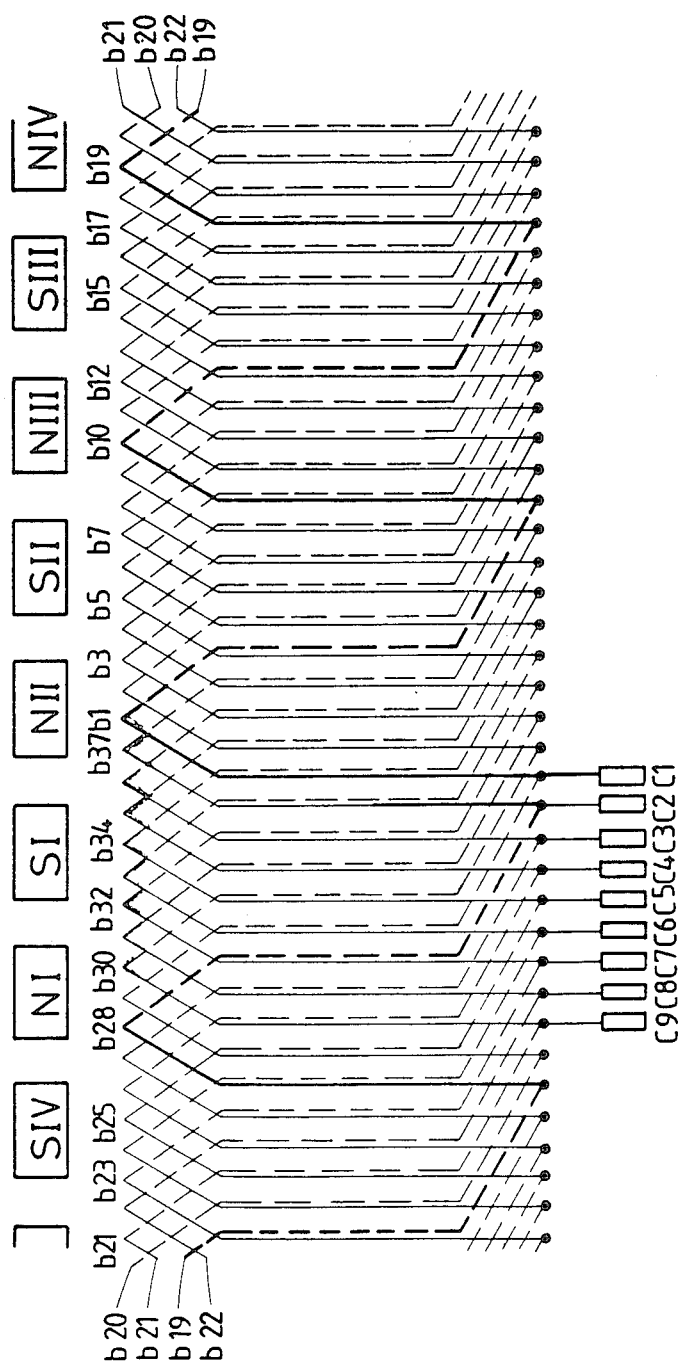
FIG. 7 is a diagrammatic representation of the arrangement of the windings of the stator winding.

In the example shown in FIGS. 6 and 7 a series wave winding has been chosen that is formed of thirty seven coils. There are nine coils per pair of poles plus one coil enabling the winding to be looped. The coils occupying the same position in relation to a pair of poles, i.e. spaced by a double polar division, are connected in series, there are therefore nine groups of coils in series. The free end of the first coil of a group is connected to a connection terminal and the free end of the last coil of the same group is connected to the next connection terminal, to which is connected the free end of the first coil of the next group and so on. The group starting from the last connection terminal contains an additional coil whose free end is connected to the first connection terminal.

Thus the start of coil b1 of the first group b1-b10 -b19-b28 is connected to terminal C1 and the end of coil b28 is connected to terminal C2, from which starts the second group b37-b9-b18-b27 which ends at terminal C3 and so on. The last group b30-b2-b11-b20 -b29 starting from terminal C9 includes a fifth coil b29 enabling the end of this circuit to be connected to terminal C1. The supply voltage is in principle applied between two of the nine connection terminals C1 to C9; the winding is thus divided into two sections powered in parallel and wound in opposite directions.

As diagrammatically shown in FIG. 7, each coil b1 to b37 includes several turns, once all of coil b1 has been wound, the same wire progresses to coil b10 which has the same position with respect to the second pair of poles NII-SII as the coil b1 has with respect to poles NI-SI, which is also completely wound and then passes to coil b19 and so on until coil b28 whose end is connected to terminal C2 from which coil b28 starts whose end is connected to terminal C2 from which coil b37 starts the group b37-b9-b28-b27 which ends at terminal C3 and so on.

Nine conductors e1 to e9 lead to the exterior of the motor and towards the commutation circuit and in particular terminals f1 to f9 of nine three-position switches g1 to g9 forming part of the electronic commutation circuit G. The connection of lines e1 to e9 to the terminals C1 to C9 can be made by means of banana plugs, as shown in FIG. 6 in dotted line, which plug into passage 5c of the plate 5a.

Initially the two commutation modes will be described, i.e. firstly without cancellation of the current in a section of the armature (FIGS. 8, 9) and secondly with cancellation of the current in a branch of the armature (FIGS. 10, 11) and then in FIG. 18 the device enabling both types of commutation will be presented.

Figures 8, 9:
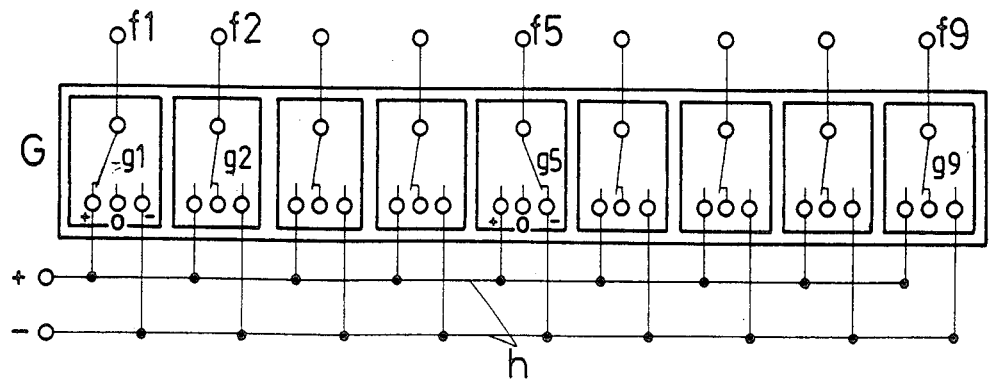
FIG. 8 is a block diagram of the electronic commutation circuit according to the first mode of commutation.
FIG. 9 is a table representing the cycle of a sequence of switchings for the excitation of a winding according to the first mode of commutation.

An electronic commutation circuit whose electronic switches work with transistors or other controlled semiconductors is known per se and is not part of the subject of the present invention. It is only mentioned here for the requirements of the functional description of the motor and the description of the series of excitations of the coils of the armature winding respectively. The functioning of each of the electronic switches g1 to g9 is that of a three-position switch whose contact arm can occupy three different positions: in the first position, shown in FIG. 8 for electronic switch g1, the contact arm is on the + terminal which is connected to the positive conductor of the supply conductors of the direct current source h. In the second position the contact arm, as shown in FIG. 8 for electronic switches g2, g3, g4, g6, g7, g8 and g9 are on the 0 terminal, the supplies to the corresponding terminals f2 to f4 and f6 to f8 then being interrupted. In the third position the contact arm, as shown in FIG. 8 for electronic switch g5, is on the - terminal connected to the negative conductors of the supply source h.

In the example of FIGS. 8 and 9 terminal f1 and f5 are connected to the + and − terminals of the supply source through switches g1 and g5 respectively, the other terminals being cut off from the supply, the coils are connected as follows: a first branch subjected to a positive voltage including the coils of the first four groups in series, namely b1–b10–b19–b18, b37–b9 –b1-8–b27, b36–b8–b17–b26, b35–b7–b16–b25 giving a total of sixteen coils and a second parallel branch whose coils are wound in the opposite direction including the coils of five other groups in series, namely b34–b6–b15–b24, b33–b5–b14–b23, b32–b4–b13–b22, b31–b3–b12–b21, b30–b2–b11–b20–b29–b37 giving twenty one coils in series passed through by an opposite current to that of the first branch.

Figures 10, 11:
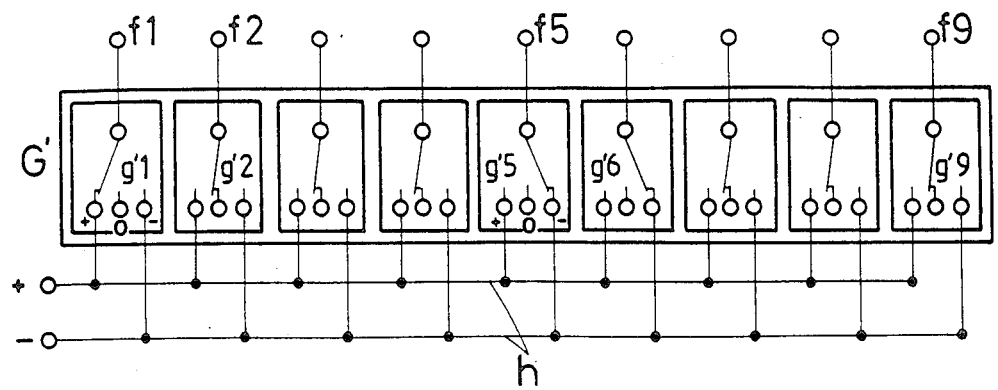
FIG. 10 is a block diagram of the electronic commutation circuit according to the second mode of commutation.
FIG. 11 is a table representing the cycle of a sequence of switchings for the excitation of a winding according to the second mode of commutation.

During the first switching and according to the first mode of commutation, the two consecutive switches acting on two consecutive terminals g5 and g6 are operated; g5 being switched to position 0 while g6 is switched to position −. Thus the group of coils b34–b-6–b15 b24 is put in series with the first branch passed through by a positive current, which thus includes twenty coils in series, while the second branch only includes seventeen coils. During this switching it is only in the first group of four coils in series b34–b6–b15–b24 that the direction of current has been changed and it was necessary to operate a single switch g5 in order to momentarily break the circuit and not two as in the usual procedure. Thus the switching is gentler. During the next switching switches g1 and g2 are operated so that the group of coils b1–b10–b19–b28 is put in series in the second circuit branch which again includes twenty one coils compared with seventeen in the first winding branch. The table in FIG. 9 indicates the eighteen switchings per pair of poles, i.e. there are 18 ×4=72 switchings per cycle or revolution of the rotor. The commutation circuit G' of FIG. 10 is the same as that of FIG. 8 and also includes nine switches g'1 to g'9 but it is programmed so that there are always two consecutive switches which are connected to the + or − terminal of the voltage source while a third is connected to the remaining terminal of the source.

Considering the first position of the table, g'1 is in the +position and g'5 and g'6 are in the − position, we have the first four groups of coils b1 –b10 –b19–b28, b37–b9–b18–b27, b36–b8–b17–b26 and b35 –b7–b1-6–b25 which are connected in series and form the first branch, the group b34–b6–b15–b24 through which no current passes as its two ends are at the same potential and the second branch formed of groups b33–b5 –b1-4–b23, b32–b4–b13–b22, b31–b3–b12–b21 and b30–b-2–b11–b20–b29.

It should be noted that the impedances of the two branches in this case are almost balanced because the first contains sixteen coils and the second seventeen coils. During the next switching, switches g'2 and g'5 are operated so that the two terminals f1 and f2 of the group b1–b10–b15–b28 are at the same potential while the group b34–b6–b15 –b24, which previously had not been passed through by a current, is placed in series with the coils of the first branch, this branch therefore still containing sixteen coils and the second group seventeen coils.

Switching in this mode of operation is even gentler because, before changing the direction of the current in a group, the current is first cancelled, which reduces the electrical shock due to this sudden change in direction of current. On the other hand the impedances of the two branches in parallel always remain the same. In fact, during the first eight positions of the switches there are sixteen coils in the first branch passed through by the positive current and seventeen in the second, at the ninth and eighteenth positions there are sixteen coils in the two branches and for the nine other switchings there are seventeen coils in the first branch and sixteen in the second.

It has been shown that the switching by the circuit G' previously described is even gentler than that by the circuit G but the choice of one or the other switching is dictated by the requirements of the load because, as previously mentioned, at high speed the switching is not carried out accurately if circuit G' is used.

The device according to the invention (FIG. 18) includes a control unit UC which receives the signals hg emitted by the position sensors and also signals which are a function of the speed v of the motor and of the current i. On the basis of these signals v and i, the device UC controls a switching circuit G, G' either in the mode of circuit G or in the mode of circuit G'. In reality, the circuit UC selects and operates the switches of circuit G, G', in order to have either a switching mode like that of circuit G' (especially on starting) or like that of circuit G; we therefore have the most suitable form of commutation according to the load on the motor.

All the electronic switches g1 to g9 or g1' to g9' of commutation circuit G or G' respectively, or G, G', are controlled in a way known per se, by the rotary encoder synchronized with the rotor according to the angular position of the rotor, as mentioned, with reference to FIG. 1. This photoelectric encoder includes, in the considered example, nine emitter-receiver units arranged along an arc of circle and the disk has four notches which are regularly shifted by 90° with respect to each other in such a way that during each rotation of the motor shaft the electronic circuit G or G' or G, G', is switched 4×18=72 times. It is also possible to use an inductive encoder or a Hall effect generator of known type or any other type of encoder.

The manufacture of an armature, 3 or 3' respectively, will now be described with its various parts. The coils of an armature winding 4 or 4' respectively, are continuously wound using a known winding machine (patent FR No. 2.471.074) in rosette shape using wire insulated with a synthetic resin lacquer. The interconnections between the coils wound above one another are therefore located at the center of the rosette. Through the completed winding is sent a current which is strong enough for the synthetic resin insulation of the wire to soften and, after the subsequent cooling of the winding, the insulations of neighboring wires stick to each other. In this way a rigid self-supporting winding is obtained which has the appearance of a flat basket whose peripheral zone, which includes a large number of segments of wires running along the periphery, that is to say the superimposed external sides of the coils, form an excess thickness in the shape of a rim partially folded back on one side.

Figure 4:
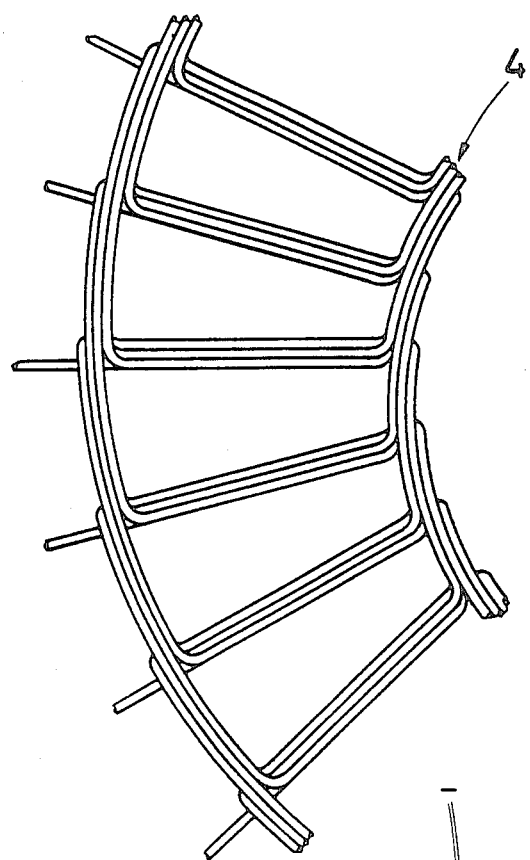
FIG. 4 a partial diagrammatic view of the winding.

The next phase consists in separating the groups of coils from each other, the ends of which are located near the periphery of the rosette, by cutting the segments of wires still connecting the groups of coils, which gives a rosette as shown in FIG. 4.

The previously described connection terminals 5a and 5'a respectively, are arranged in a segment of ring on the periphery of the rosette, spaced from each other in such a way that they can be electrically insulated. In order to do this we place in an appropriate mold the assembly formed from the armature winding 4 and the connection terminals 5a with the armature iron 6 previously rolled and placed on the external surface of the coils, i.e. on the surface of the coils facing the stator plate, and the whole is embedded in the synthetic material 13, as shown in FIG. 3. The plastic material 13 is preferably an epoxy resin. The armature winding is thus completely embedded in the synthetic resin 13 which also extends over the entire periphery of the iron in the considered example; the space between the connection terminals 5a is filled with the same synthetic material 13 which electrically insulates these terminals 5a. In this way a compact prefabricated armature is obtained including the connection terminals connected to the armature winding 4, and the armature iron 6. All that remains is to fix this armature 3 on the internal face of a motor plate 1, the external conductors e will be connected to the corresponding terminals 5a through the ring 2 of the stator.

The described armature is characterized on the one hand by its new and rational manufacture and, on the other hand, in that the wires of the coils are not placed in the usual way in slots in plates. The manufacture of the iron of the armature and the fitting of the armature winding on the iron are significantly simplified in this way. In addition the limitation of the quantity of copper is removed, and respectively of the thickness of the wires used for the armature winding due to the size of the slots in the armature plates. If necessary it is possible to construct armature windings with quantities of copper, and respectively with wires of very different diameters and with coils having very different numbers of turns and to overmold directly with a synthetic material the same prefabricated armature irons with corresponding ring segment connections, the placing of coil wires in armature plate slots, which must be adapted to the thickness of the wires, being suppressed. By doing away with slots, this device has a very regular rotation even at very low speeds.

Figure 2:
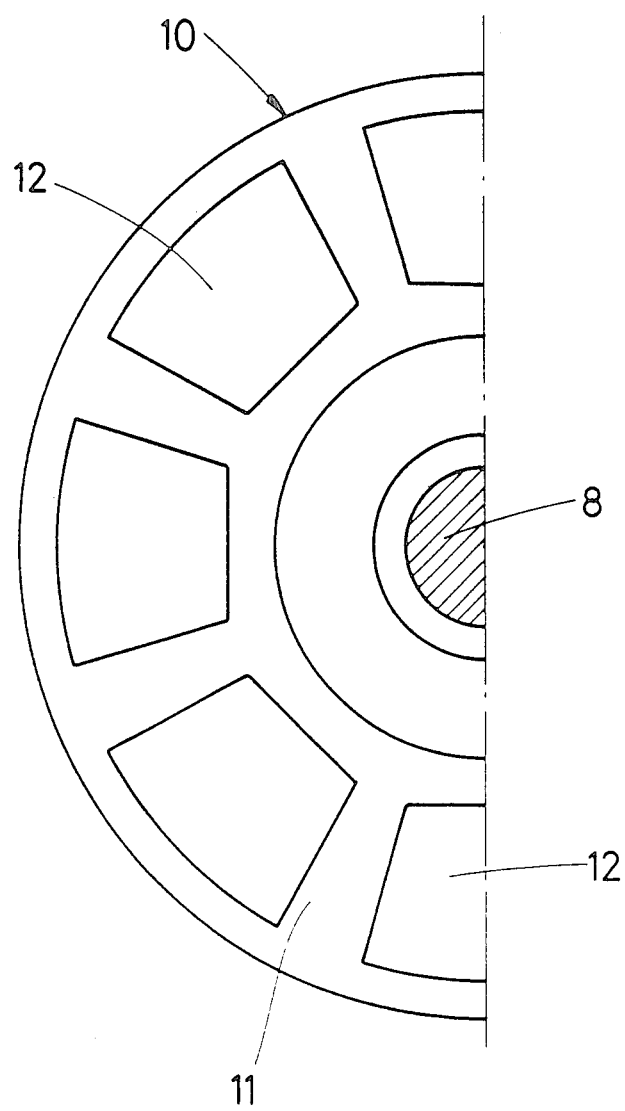
FIG. 2 a top view of the rotor of the same motor.

It is noted that the motor shown in FIGS. 1 and 2 includes a rotor in the form of a disk on each side of which is a fixed stator winding such that there are in fact two motors side by side of which the rotor is common.

Figure 12:
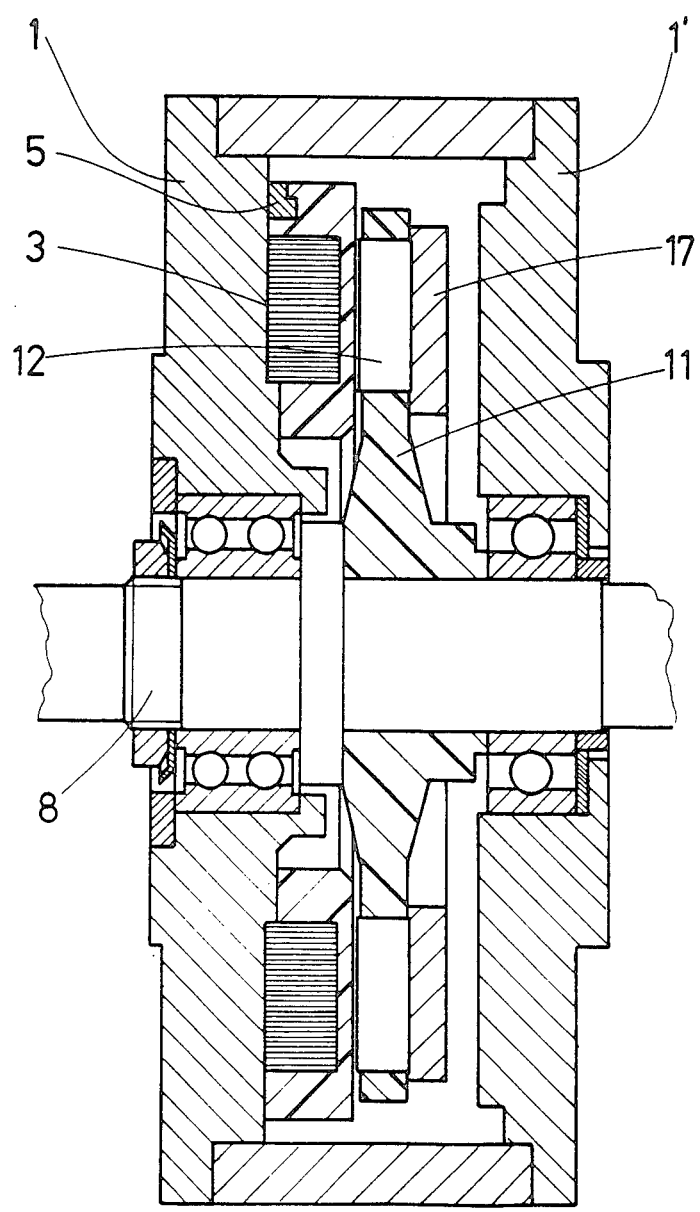
FIG. 12 shows a second embodiment of a motor in axial cross-section.

In a simplified embodiment of the motor, such as shown in FIG. 12, the motor has a single armature 3 on the plate 1 and this armature can be produced in exactly the same way as in the example shown in FIG. 1. The opposite plate 1' serves solely to close the housing. In order to close the magnetic circuit of the magnetic flux of the permanent magnets 12 of the rotor 10 on the face of the rotor opposite the armature 3, there is fixed on this face of the rotor an iron ring 17 in contact with all the poles of the permanent magnets 12, so that the magnetic fluxes of these permanent magnets can be closed through this ring 17. For the rest of the motor, the rotor can be constructed in exactly the same way as in the example according to FIGS. 1 and 2.

Figures 13, 14:
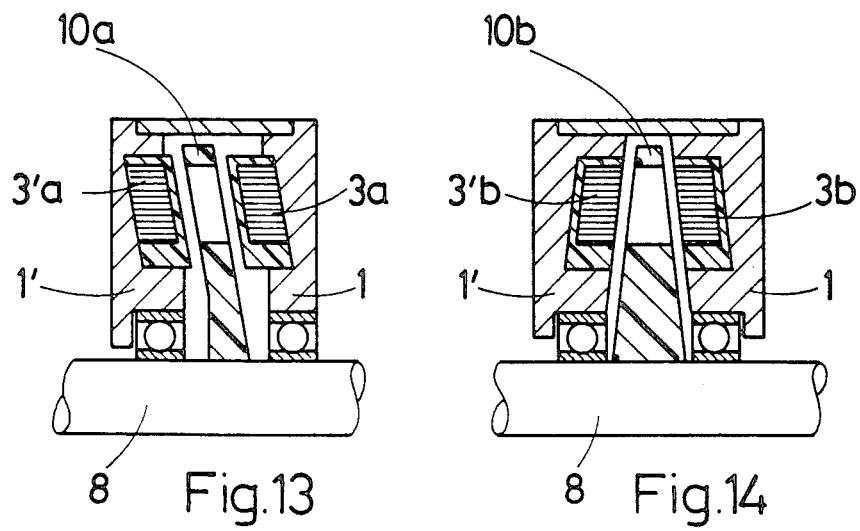
FIG. 13 is a diagrammatic representation of a third embodiment.
FIG. 14 is a diagrammatic representation of a fourth embodiment.

According to another embodiment of the motor, shown diagrammatically in FIG. 13, the rotor 10a can be slightly conical, in the form of a plate, while the two armatures 3a and 3'a situated on each side can have a shape matched to the rotor shape, i.e. can have conjugate and opposite conicities.

In the embodiment shown, also diagrammatically, in FIG. 14, the rotor 10b is biconical and the two armatures 3b and 3'b placed on each side on the plates of the stator 1 and 1' are adapted through their conicities to the two faces of the rotor respectively inclined to the spindle 8 of the motor.

The conicity of the rotor according to FIG. 13 or 14 gives greater rigidity, particularly in order to prevent displacement of the permanent magnets which are strongly attracted axially by the iron of the stators. In addition, in the case of the biconicity according to FIG. 14, the main mass of the rotor 10b is closer to the shaft 8, which has the effect of reducing its moment of inertia.

Figure 15:
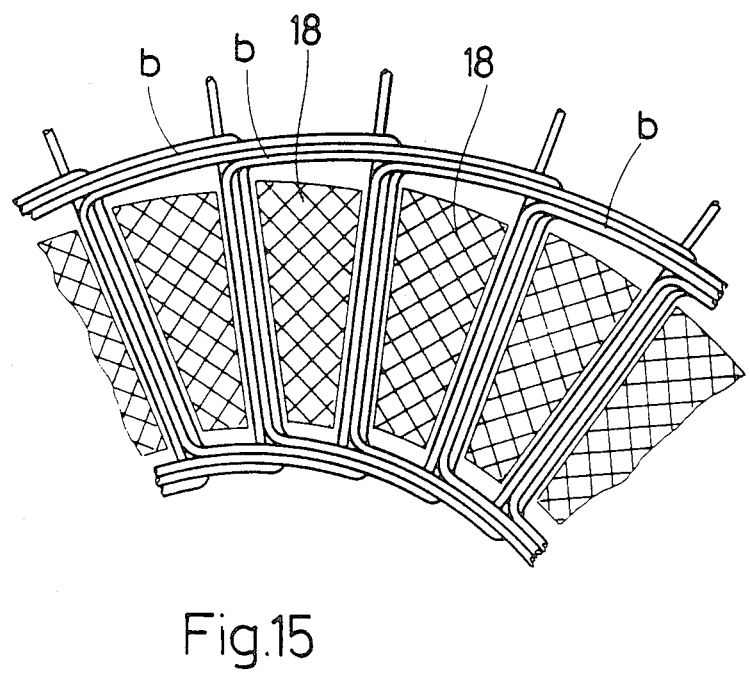
FIG. 15 is an alternate embodiment of the armature winding.

In a particularly judicious embodiment of an armature in a motor according to the invention, the triangular spaces, respectively in the shape of segments of rings (FIG. 15) between the radially directed sides of the individual coils b are filled by wedge shaped, or sector shaped pieces 18 made from ferromagnetic material, before casting the winding in the synthetic material. These pieces 18 are, seen from the direction of the motor spindle, approximately as thick as the armature winding itself and thus strengthen the armature field by reducing the air-gap by a value approximately corresponding to the thickness of the winding. If, on the other hand, it is required to maintain the armature field constant, the permanent magnets can have a smaller thickness by using armature irons 18 filling the empty spaces of the coils, which has the effect of lowering the moment of inertia of the rotor. The armature irons 18 can advantageously be made in a way that is known per se from a special iron powder which is mixed with a binding material and then shaped under pressure in such a way that the conductivity in the radial direction is very low in order to prevent the formation of eddy currents.

Motors according to the invention can be extended in such a way that there is provision on the same shaft for one or more disk shaped rotors which, if appropriate, can have different functions. It is possible to fix on the rotor shaft at least one disk which forms part of a rotary encoder for controlling the electronic commutation circuit and/or which forms part of an electromagnetic brake. It is also possible, in addition to its motor function, for the rotor to be at the same time part of a mechanical brake. These various functions can also be carried out by special disks.

The invention is not limited to the described embodiments but extends to any alternate embodiment as regards the shape of the motor, the armature and its winding within the scope of the invention as claimed. For example it is thus possible, instead of the wave wound armature described in the previous example of embodiment, to use an overlapped armature winding as this is also usual in conventional direct current motors. In an overlapped winding, the coils which are immediately next to each other are switched in series, while in a wave winding as described, it is the coils separated by the value of about a double polar division which are so switched.

Figure 16:
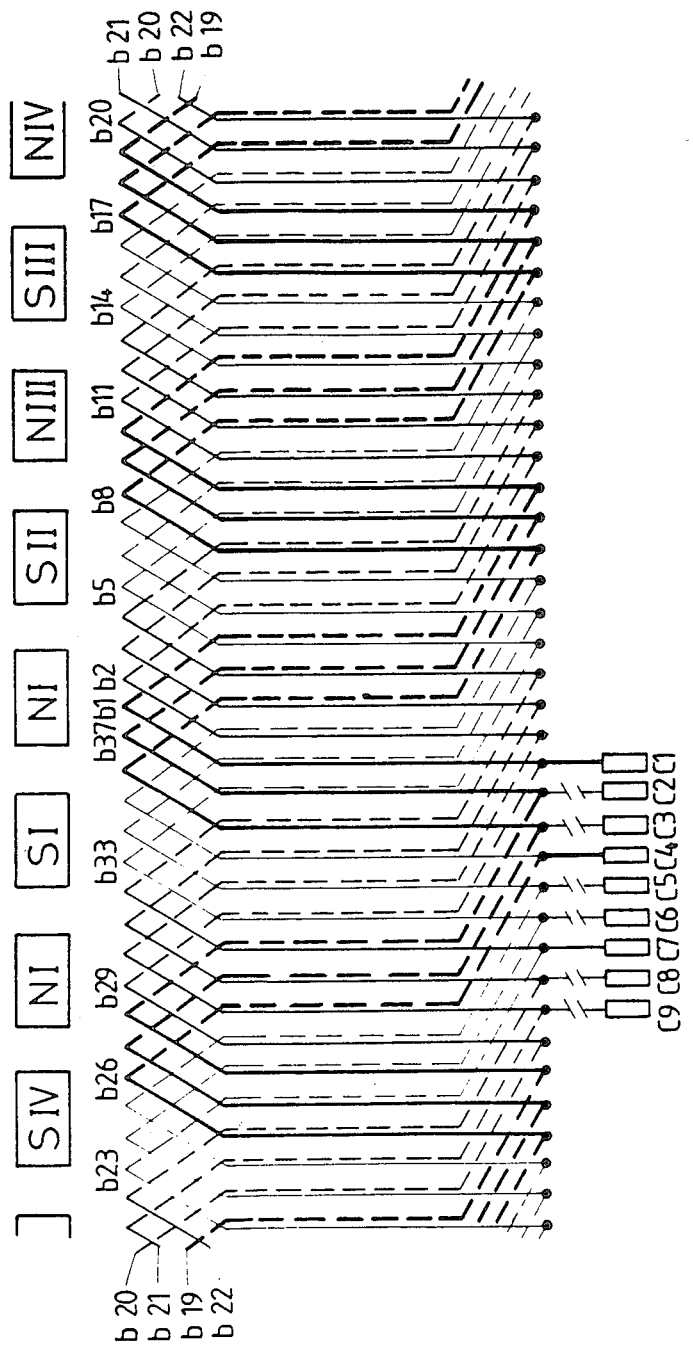
FIG. 16 shows the diagram for a delta connected wave winding.

During the construction of the armature, by choosing an odd number M of coils and also divisible by the number 3, it is easy to connect this armature in delta or star configuration, the supply in this case being carried out solely by three connection terminals. The number of sensors will in this case be equal to 3 and the number of switchings will be equal to 2p.3. Thus the construction of these armatures is simplified as they can be manufactured to a single pattern irrespective of the fixed connections of the coils. In the case of star or delta connection, it can only be a wave winding. The example shown in FIG. 16 is identical to that of FIG. 7 except that the connection between the winding and the terminals C2, C3, C5, C6, C8, C9 has been cut thus forming one branch by connecting in series the coils b1–b8 –b9–b1-0–b17–b18–b19–b26–b27–b28–b36–b37, a second branch by the coils b35–b5–b6–b7 b14 –b15–b26–b2-3–b24–b25–b33–b34 and the third branch b32–b2–b3–b-4–b11–b12–b13–b20 –b21–b22–b29–b30–b31.

Figures 17, 18:
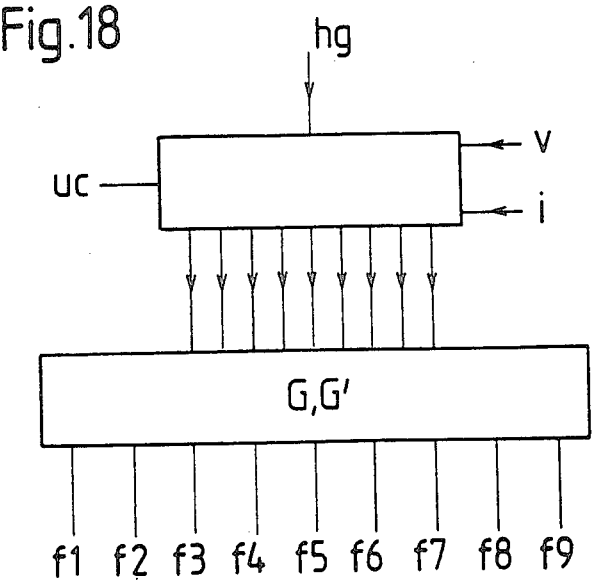
FIG. 17 is a table representing the cycle of a sequence of switchings for the excitation of the winding of the previous figure.
FIG. 18 is a diagrammatic representation of the device enabling the transition from one commutation mode to the other as a function of load.

The three branches of this winding thus formed are delta connected and the switching is carried out as previously described, i.e. there are six switchings per complete revolution of the rotor according to the table in FIG. 17 in relation to the terminals C1, C4, and C7. In this case there are three sensors acting on three switches which have been named for convenience g"1, g"4 and g"'7.

I claim:

1. Direct current motor without commutator, with electronic communication, with permanent magnet excitation, provided with a rotor carrying p pairs of permanent magnets and a stator provided with at least one winding, the powering of the coils of the winding being able to be controlled by an encoder synchronized with the rotor by mechanical means, through an electronic commutation circuit including a plurality of sensors arranged along the periphery of the encoder detecting the angular position of the rotor, the number of said plurality of sensors is odd and equal to $2N+1$, N being a positive integer, the number of connection terminals M of the winding to which the supply voltage is selectively applied is equal to multiple of $2N+1$ including $2N+1$, the number of commutations per complete revolution of the rotor is equal to $2p(2N+1)$ and during each commutation the connection between one of the terminals of the voltage source and at least one of the connection terminals of the winding is maintained, characterized in that the commutation circuit (G, G') is designed to operate in two commutation modes, the choice of mode being made by a control unit (UC) according to the requirements of the load, the two modes are:

during each commutation operation, two switches connected to two sensors acting on two consecutive connection terminals are simultaneously operated, one disconnecting the consecutive connection terminal connected to the other terminal of the voltage source while the second switch connects the other consecutive connection terminal to the other terminal of the voltage source; and in each commutation state, three switches connect three connection terminals to the voltage source, two consecutive connection terminals being connected to the same terminal of the voltage source and, during each commutation, two switches acting on two non-consecutive terminals are operated such that each of the terminals of the voltage source is alternatively connected to two consecutive connection terminals.

2. Motor according to claim 1, characterized in that the choice of commutation mode is automatically controlled according to the current of the motor.

3. Motor according to claim 1, characterized in that the winding is a series wave winding.

4. Motor according to claim 1, characterized in that the winding is an overlapped winding.

5. Motor according to claim 1, characterized in that the number of connection terminals M is divisible by three.

6. Motor according to claim 5, characterized in that the number of connection terminals is equal to nine.

7. Motor according to claim 6, characterized in that if $M \geq 9$ only one connection terminal in every M/3 terminals is connected to the winding, the other terminals being disconnected from the winding, and that in this case the number of sensors is equal to 3 and the number of commutations equal to 2p.3.

8. Motor according to claim 1, characterized in that the connection terminals are formed from rectangular plates provided with a notch and with two parallel passages in the direction of the height of said plates, one being intended to be connected to the winding and the other to one of the switches through a wire, and in that said terminals are placed on the periphery of the winding and embedded in a synthetic material.

9. Motor according to claim 1, characterized in that the choice of commutation mode is automatically controlled according to the speed of the motor.

10. Motor according to claim 1, characterized in that the choice of commutation mode is automatically controlled accoridng to the current and the speed of the motor.

* * * * *